(12) United States Patent
de Peralta et al.

(10) Patent No.: US 9,281,139 B2
(45) Date of Patent: Mar. 8, 2016

(54) COVER ASSEMBLY FOR AN ELECTRICAL SWITCH

(71) Applicant: Electronic Theatre Controls, Inc., Middleton, WI (US)

(72) Inventors: Jeff de Peralta, Middleton, WI (US); Ben Rodgers, Middleton, WI (US); Dan Talajkowski, Middleton, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 147 days.

(21) Appl. No.: 14/153,288

(22) Filed: Jan. 13, 2014

(65) Prior Publication Data

US 2015/0200061 A1 Jul. 16, 2015

(51) Int. Cl.
*H01H 9/02* (2006.01)

(52) U.S. Cl.
CPC ........... *H01H 9/02* (2013.01); *H01H 2223/034* (2013.01); *H01H 2223/048* (2013.01)

(58) Field of Classification Search
CPC ...................................................... H01H 9/02
USPC .......................................................... 174/54
See application file for complete search history.

(56) References Cited

U.S. PATENT DOCUMENTS

| | | |
|---|---|---|
| 1,698,231 A | 1/1929 | Hubbell |
| 2,889,437 A | 6/1959 | Christensen |
| 3,598,900 A | 8/1971 | Drake |
| 4,803,380 A | 2/1989 | Jacoby, Jr. et al. |
| 4,835,343 A | 5/1989 | Graef et al. |
| 4,857,669 A * | 8/1989 | Kitamura et al. ............... 174/53 |
| 4,924,349 A | 5/1990 | Buehler et al. |
| D311,678 S | 10/1990 | Graef et al. |
| 5,041,698 A | 8/1991 | Takagi et al. |
| D327,212 S | 6/1992 | Hubben et al. |
| 5,189,259 A | 2/1993 | Carson et al. |
| 5,221,814 A | 6/1993 | Colbaugh et al. |
| 5,456,373 A | 10/1995 | Ford |
| 5,744,750 A * | 4/1998 | Almond ........................ 174/541 |
| 6,102,360 A | 8/2000 | Clegg et al. |
| 6,508,445 B1 | 1/2003 | Rohmer |
| 6,609,927 B2 | 8/2003 | Kidman |
| D484,392 S | 12/2003 | Mayo et al. |
| D493,695 S | 8/2004 | Wengrower |
| 6,974,910 B2 | 12/2005 | Rohmer |
| 7,030,318 B2 | 4/2006 | Tufano et al. |
| 7,030,319 B2 | 4/2006 | Johnsen et al. |
| 7,071,414 B2 | 7/2006 | Kim |
| 7,102,081 B2 | 9/2006 | Xu et al. |
| 7,118,413 B2 | 10/2006 | Kidman |
| 7,122,740 B2 | 10/2006 | Xu et al. |
| 7,176,380 B2 | 2/2007 | Tufano et al. |
| 7,196,266 B2 | 3/2007 | Binder et al. |

(Continued)

*Primary Examiner* — Dhirubhai R Patel
(74) *Attorney, Agent, or Firm* — Michael Best & Friedrich LLP

(57) ABSTRACT

A cover assembly for a first electrical switch and a second electrical switch. The cover assembly includes an alignment plate configured to be removably coupled to the first electrical switch. The alignment plate includes a first alignment feature that receives a portion of the first electrical switch to align the alignment plate with the first electrical switch, and a second alignment feature that receives a portion of the second electrical switch to align the alignment plate with the second electrical switch and to align the second electrical switch with the first electrical switch. The assembly further includes a faceplate that is removably coupled to the alignment plate.

20 Claims, 5 Drawing Sheets

(56) References Cited

U.S. PATENT DOCUMENTS

| | | |
|---|---|---|
| 7,230,183 B2 | 6/2007 | Oddsen et al. |
| 7,250,580 B2 | 7/2007 | Kurek et al. |
| D550,076 S | 9/2007 | Ni |
| 7,279,636 B2 | 10/2007 | Oddsen et al. |
| 7,301,099 B1 | 11/2007 | Korcz |
| 7,456,358 B2 | 11/2008 | Swiencicki et al. |
| 7,494,371 B2 | 2/2009 | Kidman |
| 7,576,285 B1 | 8/2009 | Savicki, Jr. |
| 7,683,257 B1 * | 3/2010 | Shotey et al. .................... 174/66 |
| D639,637 S | 6/2011 | Marrero |
| 7,956,295 B2 | 6/2011 | Arbel |
| D660,131 S | 5/2012 | Tailor et al. |
| 8,222,521 B2 | 7/2012 | Kimbrell et al. |
| 8,232,482 B2 | 7/2012 | Arbel |
| 8,245,453 B2 | 8/2012 | Struthers et al. |
| 8,294,028 B2 | 10/2012 | Huang |
| 8,299,358 B2 | 10/2012 | Huang |
| 8,314,333 B1 | 11/2012 | Shotey et al. |
| 8,420,956 B2 | 4/2013 | Alderson et al. |
| 2005/0205284 A1 | 9/2005 | Ray |
| 2006/0027389 A1 | 2/2006 | Xu et al. |
| 2007/0272532 A1 | 11/2007 | Pessina et al. |
| 2009/0020307 A1 | 1/2009 | Roach, Jr. |
| 2009/0126968 A1 | 5/2009 | Glas |
| 2011/0056743 A1 | 3/2011 | Solan |
| 2012/0122338 A1 | 5/2012 | Gonzalez |
| 2012/0287564 A1 | 11/2012 | Lochet et al. |
| 2012/0292097 A1 | 11/2012 | Arbel |

* cited by examiner

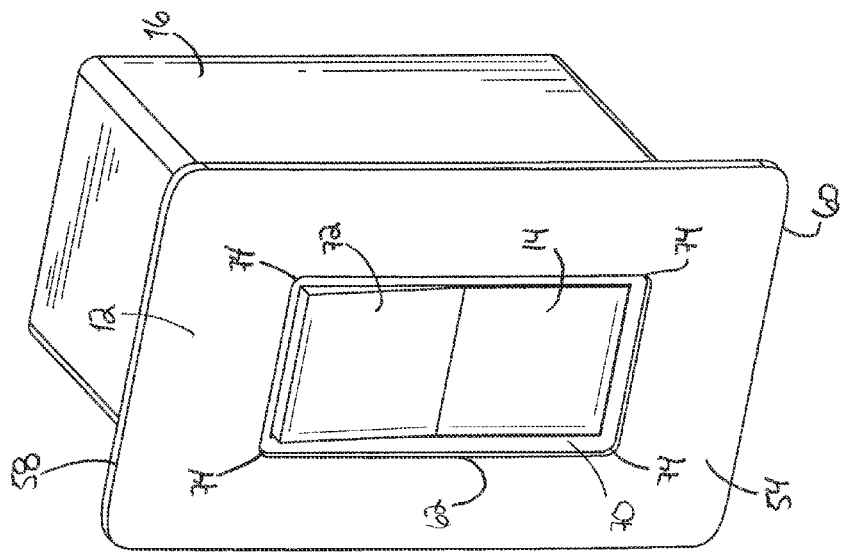
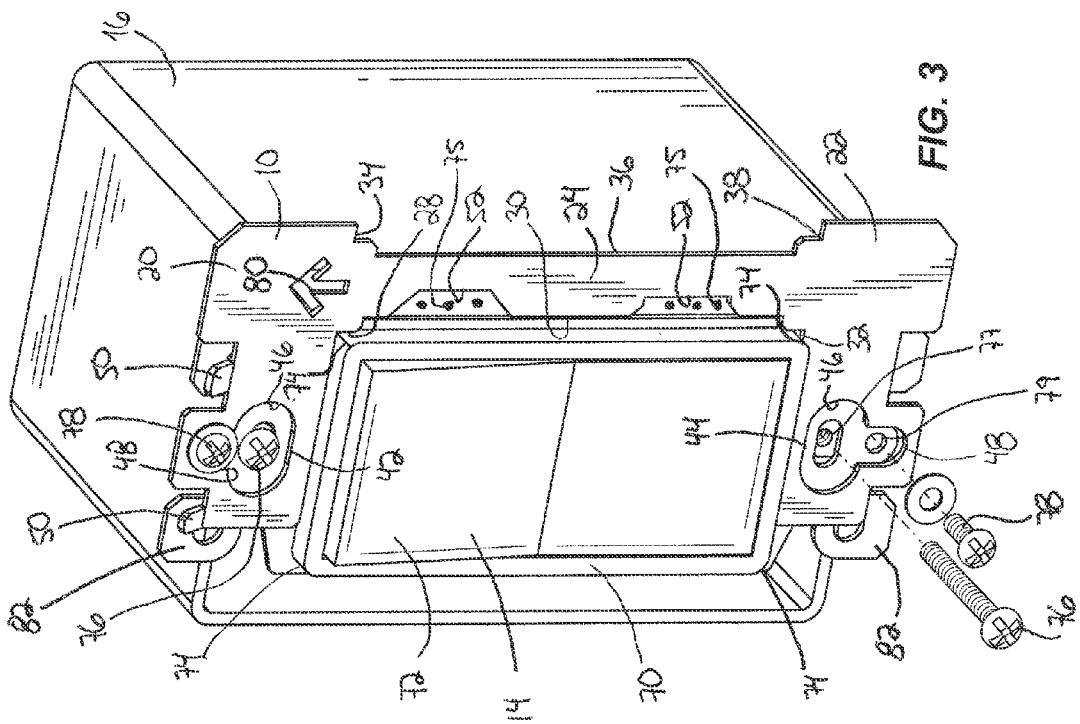
FIG. 4
FIG. 3

COVER ASSEMBLY FOR AN ELECTRICAL SWITCH

BACKGROUND

The present invention relates to a cover assembly for an electrical switch.

Electrical switches in homes, office buildings, and the like are typically attached to a gang box. The gang box is often attached to a framing member and then the electrical switch is attached to the gang box. If more than one switch is desired at a location, then a multiple switches are attached to a multi-gang box. The electrical switch or switches and the gang box are covered by a faceplate that provides an aesthetically pleasing trim and also inhibits access to the switch and wiring inside the gang box but still allows the user to operate the switch.

SUMMARY

In one embodiment, the invention provides a cover assembly for a first electrical switch and a second electrical switch. The cover assembly includes an alignment plate configured to be removably coupled to the first electrical switch. The alignment plate includes a first alignment feature that receives a portion of the first electrical switch to align the alignment plate with the first electrical switch, and a second alignment feature that receives a portion of the second electrical switch to align the alignment plate with the second electrical switch and to align the second electrical switch with the first electrical switch. The assembly further includes a faceplate that is removably coupled to the alignment plate.

In another embodiment, the invention provides an electrical switch and cover assembly that includes a first electrical switch, a second electrical switch, and an alignment plate removably coupled to the first electrical switch. The alignment plate includes a first alignment feature that receives a portion of the first electrical switch to align the alignment plate with the first electrical switch, and a second alignment feature that receives a portion of the second electrical switch to align the alignment plate with the second electrical switch and to align the second electrical switch with the first electrical switch. The assembly further includes a faceplate that is removably coupled to the alignment plate.

Other aspects of the invention will become apparent by consideration of the detailed description and accompanying drawings.

BRIEF DESCRIPTION OF THE DRAWINGS

FIG. 3 is a perspective view of the alignment plate of FIG. 1 attached to an electrical switch according to one embodiment of the invention.

FIG. 4 is a perspective view of the faceplate of FIG. 2 attached to the alignment plate and the electrical switch of FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 2:
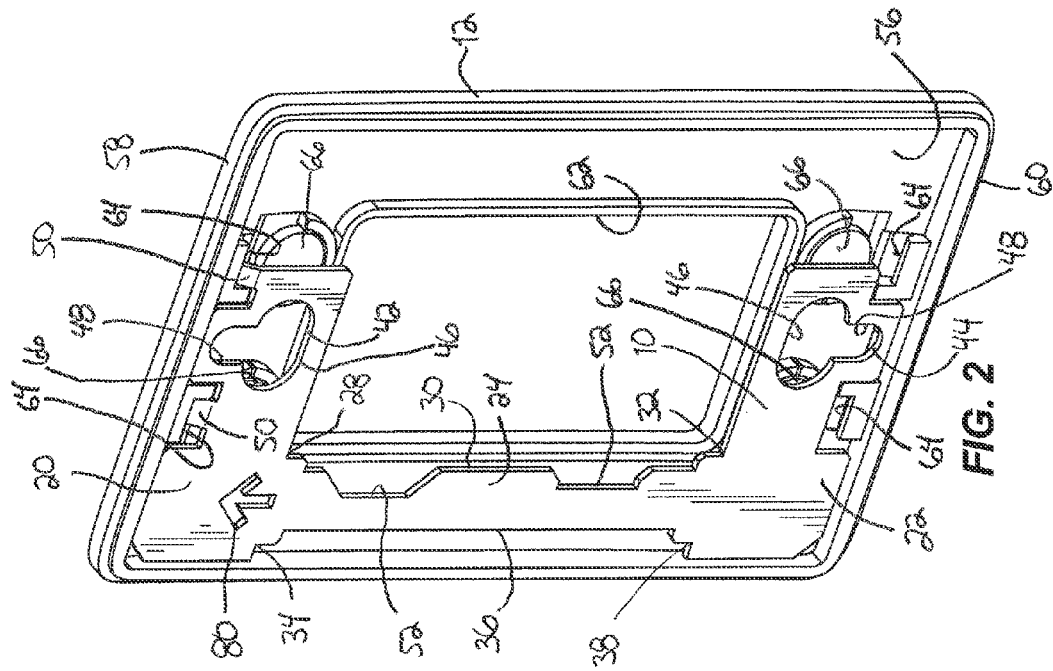
FIG. 2 is a perspective view of the alignment plate of FIG. 1 attached to a faceplate according to one embodiment of the invention.
Figure 1:
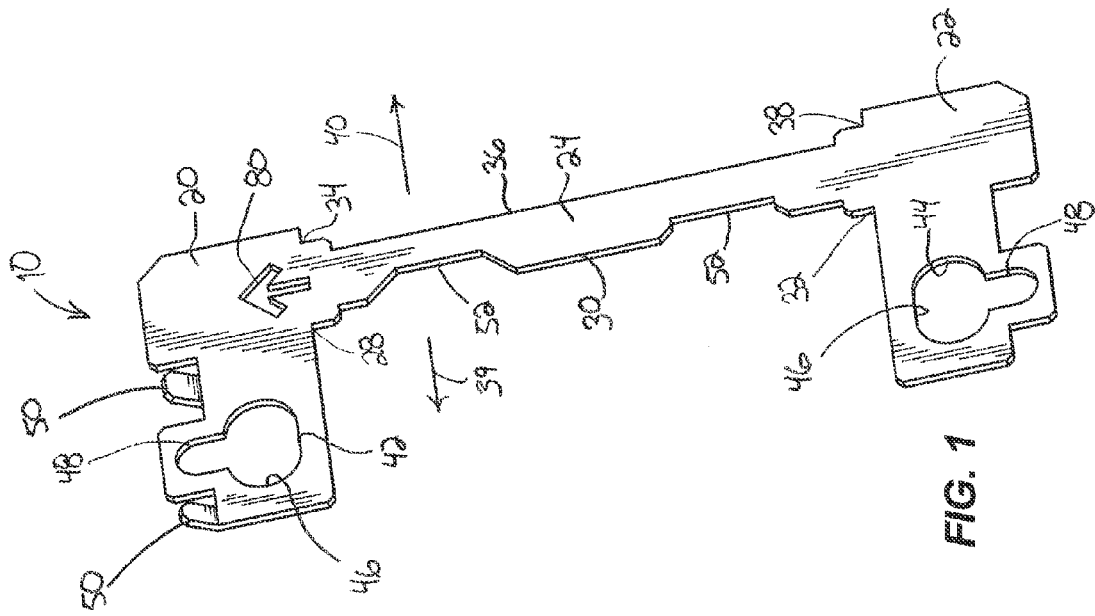
FIG. 1 is a perspective view of an alignment plate according to one embodiment of the invention.

FIGS. 1 and 2 illustrate an alignment plate 10 and a faceplate 12. As illustrated in FIGS. 3 and 4, the alignment plate 10 is used to attach the faceplate 12 to an electrical switch 14 and an electrical gang box 16 as will be described in more detail below.

The alignment plate 10 includes an upper portion 20, a lower portion 22, and a divider portion 24 that connects the upper portion 20 to the lower portion 22. A first alignment feature 28 is formed between the upper portion 20 and the divider portion 24 on a first side 30 of the divider portion 24 and a second alignment feature 32 is formed between the lower portion 22 and the divider portion 24 on the first side 30 of the divider portion 24. A third alignment feature 34 is formed between the upper portion 20 and the divider portion 24 on a second side 36 of the divider portion 24 and a fourth alignment feature 38 is formed between the lower portion 22 and the divider portion 24 on the second side 36 of the divider portion 24. The alignment features 28,32 are located on the first side 30 of the divider portion 24 such that the alignment features 28,32 open toward a first direction 39 and the alignment features 34,38 are located on the second side 36 of the divider portion 24 such that the alignment features 34,38 open toward a second direction 40 that is opposite the first direction 39. In the illustrated embodiment, the alignment features 28, 32, 34,38 are recesses, and more specifically, 90-degree angle notches formed in the alignment plate 10.

The alignment plate 10 further includes an upper attachment aperture 42 that extends through the upper portion 20 of the alignment plate 10 and a lower attachment aperture 44 that extends through the lower portion 22 of the alignment plate 10. Each attachment aperture 42,44 includes a relatively large portion 46 and a relatively small portion 48. The alignment plate 10 further includes projections 50 used to attach the faceplate 12 to the alignment plate 10 as will be discussed in more detail below. In the illustrated embodiment, the alignment plate 10 is formed as a single piece from metal, such as by stamping or the like.

The alignment plate 10 also includes recesses 52 located on the first side 30 of the divider portion 24. The recesses 52 provide access to the side of the switch 14 when the alignment plate 10 is attached to the switch 14 as illustrated in FIG. 3, the purpose of which will be discussed in more detail below.

Referring to FIGS. 2 and 4, the faceplate 12 includes a front side 54, a back side 56, a top end 58, and a bottom end 60. A switch aperture 62 extends all the way through the faceplate 12. In the illustrated embodiment, the switch aperture 62 is substantially rectangular but in other embodiments, the switch aperture can have other suitable shapes. The front side 54 of the faceplate 12 is generally smooth and provides a visually appealing surface to cover the gang box 16 and alignment plate 10 and portions of the switch 14. The back side 56 of the faceplate 12 includes alignment recesses 64 located adjacent the top end 58 and the bottom end 60 of the faceplate 12. The back side 56 of the faceplate 12 includes magnets 66 located adjacent the top end 58 and the bottom end 60. The magnets 66 couple the faceplate 12 to the alignment plate 10 as will be discussed in more detail below.

The alignment plate 10 is used to attach the faceplate 12 to the electrical switch 14. The illustrated electrical switch 14 includes a bezel 70 and an actuator 72. The actuator 72 is movable relative to the bezel 70 to turn the switch off and on. The illustrated bezel 70 is generally rectangular and includes protrusions 74, which are corners 74 of the bezel 70 in the illustrated embodiment. Although the illustrated embodiments show the electrical switch 14 that includes the actuator 72 that is movable (i.e., flipped back and forth) relative to the bezel 70, in other embodiments, the electrical switch can take other suitable forms. For example, the actuator may be slidable relative to the bezel or the switch may not include a movable actuator, but rather include a touch or motion sensor.

The switch 14 further includes control features or settings that can be adjusted using buttons 75. The buttons 75 for adjusting these settings are adjacent the recesses 52 when the alignment plate 10 is attached to the switch 14 and the recesses 52 provide access to the buttons 75 for the user to adjust the switch settings. The control features or switch settings can include modes, presets, record presets, reprogram controls, and the like.

In operation, to attach the cover assembly to the electrical switch 14, the user first attaches the switch 14 to the gang box 16. The switch 14 is attached to the gang box 16 using fasteners 76, which are screws in the illustrated embodiment that are received in threaded holes 77 of the gang box 16. The screws 76 can be left slightly loose so the switch 14 is somewhat movable relative to the gang box 16.

Next, the user attaches the alignment plate 10 to the switch 14 using fasteners 78, which are screws in the illustrated embodiment that are received in threaded holes 79 of the switch 14. To do this, the user places the alignment plate 10 on the switch 14 so that one of the corners 74 of the bezel 70 is received in the first alignment recess 28 of the alignment plate 10 as illustrated in FIG. 3. Indicium 80, which is an arrow that extends through the plate 10, indicates to the user in what direction the alignment plate 10 should be attached so that the projections 50 are located adjacent the top of the switch 14. Another one of the corners 74 of the bezel 70 is received in the second alignment recess 32 of the plate 10 as illustrated in FIG. 3. In the illustrated embodiment, the corners 74 of the bezel 70 directly contact the alignment plate 10. The large portions 46 of the attachment apertures 42,44 are large enough so that the screws 76 do not interfere with the attachment of the alignment plate 10 to the switch 14. However, the small portions 48 of the apertures 42,44 are sized small enough so that the screws 78 are tightened to capture the alignment plate 10 between attachment tabs 82 of the switch 14 and the screws 78 to couple the plate 10 to the switch 14. The screws 78 are tightened so that the alignment plate 10 is generally not movable relative to the electrical switch 14. Then, the user can slightly move the switch 14 and the alignment plate 10 relative to the gang box 16 to align the switch 14 and the plate 10 relative to a desirable point of reference, such as a wall, door, true level, or the like. After the switch 14 is aligned with the point of reference, the screws 76 are tightened so that the switch 14 and alignment plate 10 are fixed relative to the gang box 16.

Next, the user attaches the faceplate 12 to the switch 14 and the alignment plate 10. To attach the faceplate 12, the user inserts the projections 50 of the plate 10 into the two adjacent alignment recesses 64 of the faceplate 12 (see FIG. 2). The faceplate 12 includes alignment recesses 64 adjacent the top end 58 and the bottom end 60 so that the faceplate 12 can be attached to the alignment plate 10 in either of two orientations. With the projections 50 received in one pair of recesses 64, the user pivots the faceplate 12 on the projections 50 and pivots the bottom end 60 of the faceplate 12 toward the alignment plate 10. Eventually the magnetic force between the magnets 66 draws the faceplate 12 to the alignment plate 10 to secure the faceplate 12 to the alignment plate 10. To remove the faceplate 12, the user pivots the bottom end 60 of the faceplate 12 away from the alignment plate 10, overcoming the magnetic forces, and then lifts the faceplate 12 from the projections 50.

As illustrated in FIG. 4, when the faceplate 12 is attached to the alignment plate 10 no fasteners or control features are visible. This provides a visually appealing appearance to the user.

Figure 5:
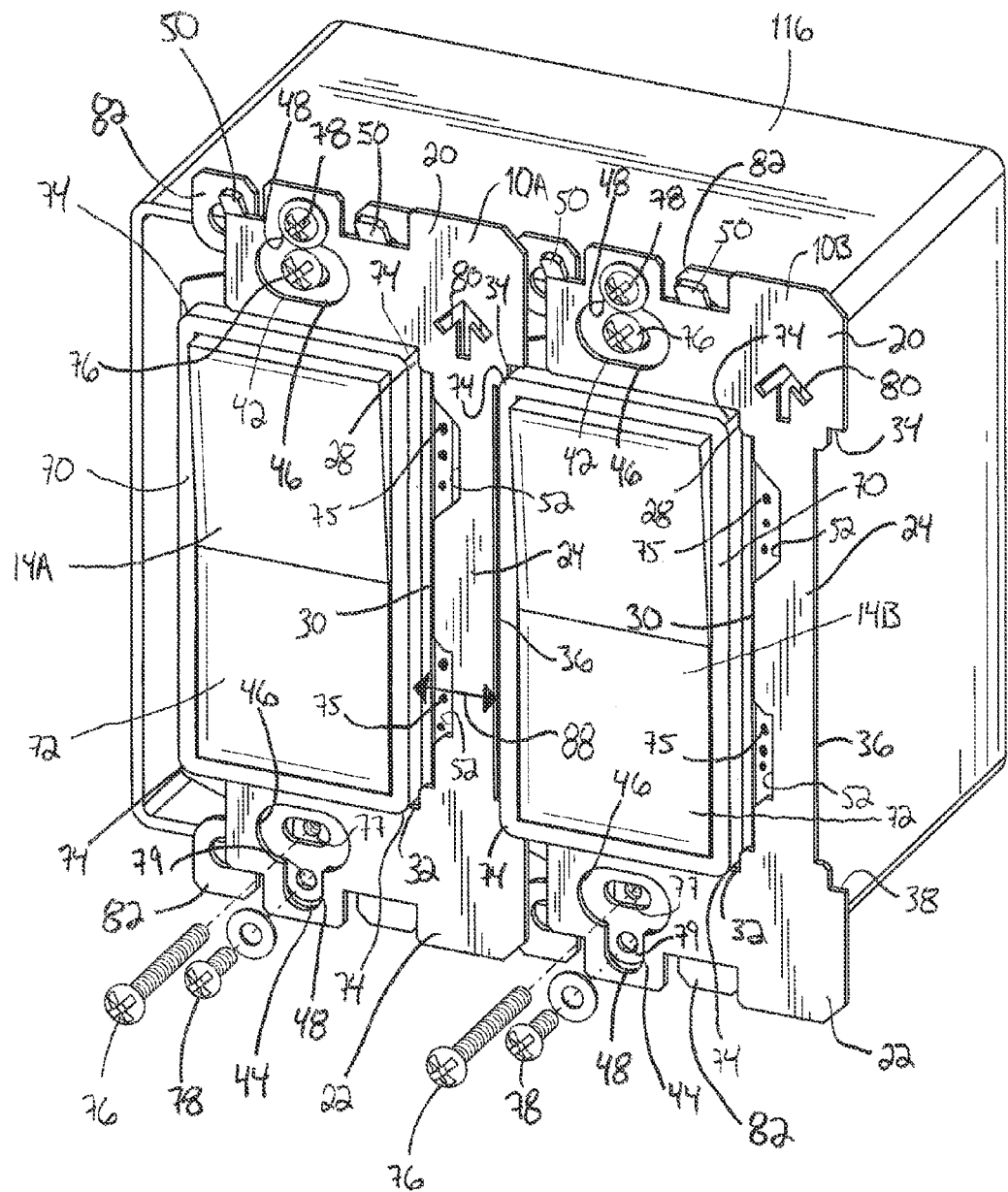
FIG. 5 is a perspective view of two of the alignment plates of FIG. 1 attached to two electrical switches and a multi-gang box according to another embodiment of the invention.
Figure 6:
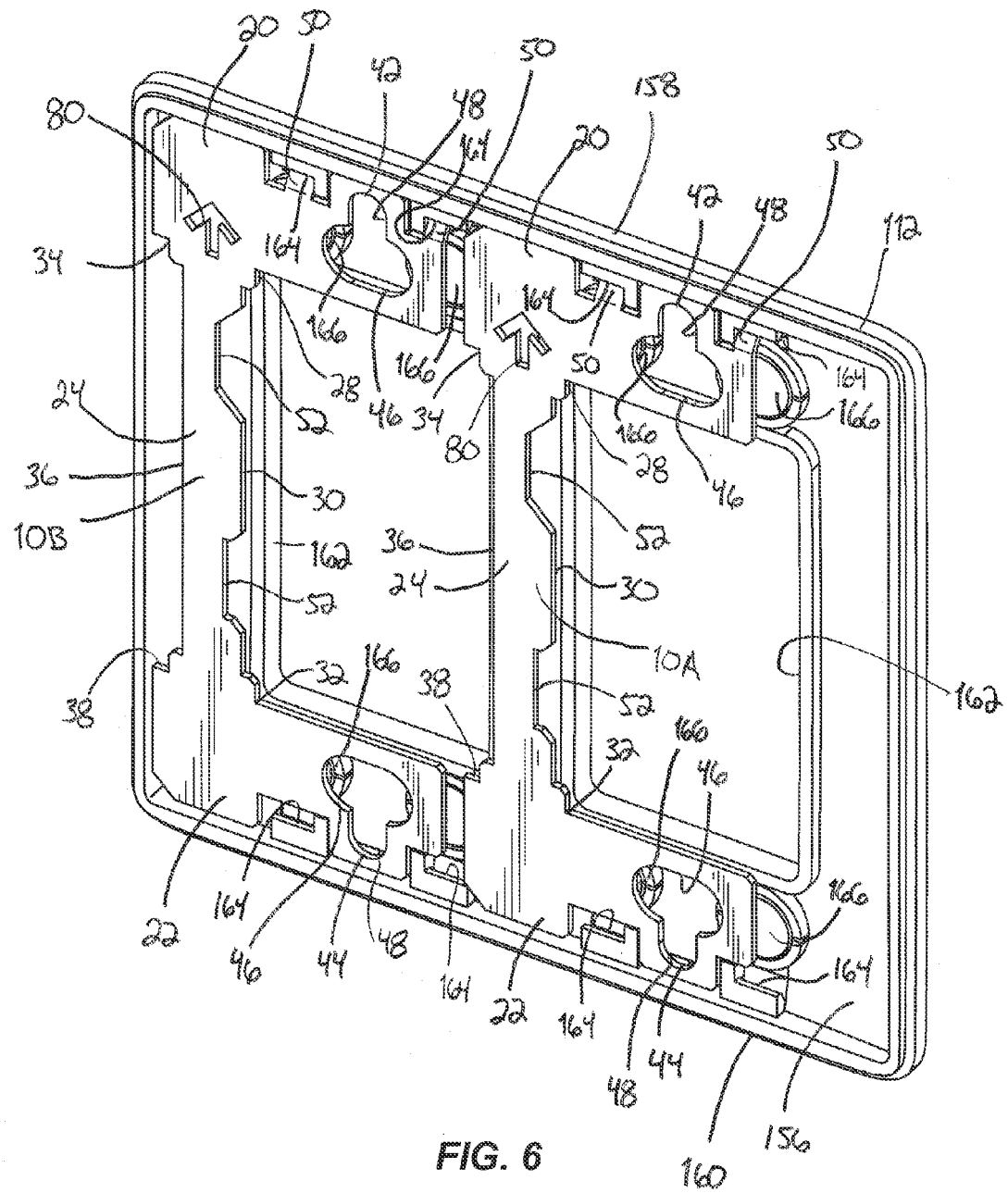
FIG. 6 is a perspective view of two of the alignment plates of FIG. 1 attached to a faceplate for use with the two electrical switches of FIG. 5.
Figure 7:
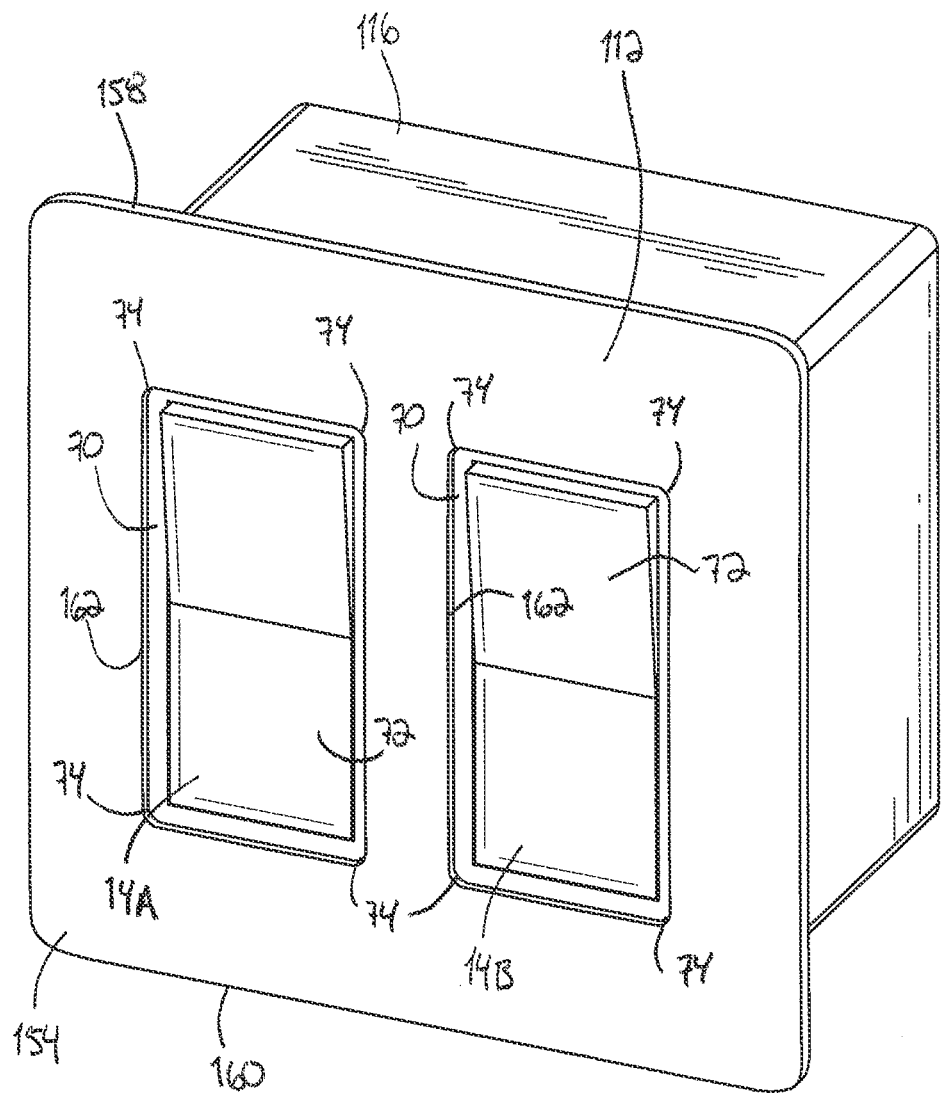
FIG. 7 is a perspective view of the faceplate of FIG. 6 attached to the alignment plate and the electrical switches of FIG. 5.

FIGS. 1-4 illustrate a single alignment plate 10 used to attach the faceplate 12 having a single switch aperture 62 to a single switch 14 and single gang box 16. FIGS. 5-7 illustrate how two of the alignment plates 10 can be used to attached a double faceplate 112 having two switch apertures 162 to a double gang box 116 that houses two switches 14.

With continued references to FIGS. 5-7, first and second alignment plates 10A and 10B are the same as the alignment plate 10 described above with regard to FIGS. 1-4. Also, the illustrated first and second switches 14A and 14B in FIGS. 5-7 are the same as the switch 14 described above with regard to FIGS. 1-4. The gang box 116 is similar to the gang box 16 of FIGS. 1-4. However, the gang box 116 is a double gang box and therefore wider than the gang box 16 so that the double gang box 116 is used with two switches instead of one. The double faceplate 112 is similar to the single faceplate 12 described above and like components have been given like reference numbers plus 100 and the only difference between the single faceplate 12 and the double faceplate 112 will be discussed. The double faceplate 112 includes two switch apertures 162. A pair of alignment recesses 164 are located adjacent the top end 158 at both switch apertures 162, and a pair of alignment recesses 164 are located adjacent the bottom end 160 at both switch apertures 162. Likewise a pair of magnets 166 are located adjacent the top end 158 at both switch apertures 162, and a pair of magnets 166 are located adjacent the bottom end 160 at both switch apertures 162.

In operation, to attach the cover assembly to the first and second switches 14A,14B, the user first attaches the first and second switches 14A,14B to the gang box 116. The first and second switches 14A,14B are attached to the gang box 116 using fasteners 76, which are screws in the illustrated embodiment that are received in threaded holes 77 of the gang box 116. The screws 76 are left slightly loose so the first and second switches 14A,14B are somewhat movable relative to the gang box 116 and relative to each other.

Next, the user attaches the first alignment plate 10A to the first switch 14A using fasteners 78, which are screws in the illustrated embodiment that are received in threaded holes 79 of the first switch 14A. To do this, the user places the first alignment plate 10A on the first switch 14A so that one of the corners 74 of the bezel 70 of the first switch 14A is received in the first alignment recess 28 of the first alignment plate 10A as illustrated in FIG. 5. Another one of the corners 74 of the bezel 70 of the first switch 14A is received in the second alignment recess 32 of the first alignment plate 10A as illustrated in FIG. 5. Then, the screws 78 are tightened so that the first alignment plate 10A is generally not movable relative to the first switch 14A.

Next, one of the corners 74 of the bezel 70 of the second switch 14B is inserted in the third alignment recess 34 of the first alignment plate 10A, and another one of the corners 74 of the second switch 14B is received in the fourth alignment recess 38 of the first alignment plate 10A as illustrated in FIG. 5. With the corners 74 of the second switch 14B received in the recesses 34 and 38, the user can slightly move the first alignment plate 10A along with the switches 14A,14B relative to the gang box 116 to align the switches 14A,14B and the first alignment plate 10A relative to a desirable point of reference, such as a wall, door, true level or the like. Meanwhile, the switches 14A,14B remain properly aligned relative to each other. More specifically, the switches 14A,14B do not rotate relative to each other and a horizontal spacing distance 88 between the switches 14A,14B remains fixed.

After the switches 14A,14B are aligned with the point of reference, the screws 76 are tightened so that the switches 14A,14B and the first alignment plate 10A are fixed relative to the gang box 116. Accordingly, the first alignment plate 10A aligns the second switch 14B relative to the first switch 14A and then together the switches 14A,14B are aligned as a single component along with the plate 10A relative to the desired point of reference.

Next, the second alignment plate 10B is attached to the second switch 14B using the screws 78 as illustrated in FIG. 5 that are received in the threaded holes 79 of the second switch 14B. The second alignment plate 10B primarily facilitates attaching the double faceplate 112 to the switches 14A, 14B and would not be required in all embodiments. For example, in one embodiment of the double faceplate 112 having two switch apertures 164, the double faceplate 112 can be configured so that it attaches using only a single alignment plate 10.

Next, the user attaches the double faceplate 112 to the switches 14A,14B and to the alignment plates 10A,10B. To attach the double faceplate 112, the user inserts the projections 50 of the alignment plates 10A,10B into the alignment recesses 164 of the double faceplate 112 as illustrated in FIG. 6. Then the user pivots the double faceplate 112 on the projections 50 and pivots the bottom end 160 of the double faceplate 112 toward the alignment plates 10A,10B. Eventually the magnetic force between magnets 166 draws the double faceplate 112 to the alignment plates 10A,10B to secure the double faceplate 112 to the alignment plates 10A, 10B. To remove the double faceplate 112, the user pivots the bottom end 160 of the double faceplate 112 away from the alignment plates 10A,10B, overcoming the magnetic force, and then lifts the double faceplate 112 from the projections 50.

As illustrated in FIG. 7, when the double faceplate 112 is attached to the alignment plates 10A and 10B no fasteners or control features are visible. This provides a visually appealing appearance to the user.

The foregoing description described the alignment plates 10 being used with a single gang box 16 (i.e., single switch 14) and a double gang box (i.e., switches 14A and 14B). The same alignment plates 10 can also be used with a triple, and more, gang box. In an embodiment for a triple gang box, two or three of the alignment plates 10 can be used to align the three switches.

Thus, the invention provides, among other things, a cover assembly for an electrical switch that includes the alignment plate 10 that can be used to align two or more switches and also facilitates access to the control features of each switch. Various features and advantages of the invention are set forth in the following claims.

What is claimed is:

1. A cover assembly for a first electrical switch and a second electrical switch, the cover assembly comprising:
   an alignment plate configured to be removably coupled to the first electrical switch, the alignment plate including,
      a first alignment feature that receives a first portion of the first electrical switch to align the alignment plate with the first electrical switch,
      a second alignment feature that receives a first portion of the second electrical switch to align the alignment plate with the second electrical switch and to align the second electrical switch with the first electrical switch,
      a third alignment feature that receives a second portion of the first electrical switch,
      a fourth alignment feature that receives a second portion of the second electrical switch, and
      a divider that extends from the first and second alignment features to the third and fourth alignment features; and
   a faceplate that is removably coupled to the alignment plate.

2. The cover assembly of claim 1, wherein the first alignment feature includes a first notch that receives a protrusion of the first electrical switch and the second alignment feature includes a second notch that receives a protrusion of the second electrical switch.

3. The cover assembly of claim 2, wherein the protrusion of the first electrical switch is a first protrusion, the third alignment feature includes a third notch that receives a second protrusion of the first electrical switch.

4. The cover assembly of claim 2, wherein the first notch and the second notch are both about 90 degrees.

5. The cover assembly of claim 1, wherein the first alignment feature directly contacts the first portion of the first electrical switch to align the alignment plate with the first electrical switch and the second alignment feature directly contacts the first portion of the second electrical switch to align the alignment plate with the second electrical switch.

6. The cover assembly of claim 1, wherein the first alignment feature opens in a first direction and the second alignment feature opens in a second direction opposed to the first direction.

7. The cover assembly of claim 1, further comprising a fastener that removably couples the alignment plate to the first electrical switch.

8. The cover assembly of claim 1, wherein the fastener includes a screw that extends through an aperture of the alignment plate.

9. The cover assembly of claim 1, wherein the faceplate directly attaches to the alignment plate.

10. The cover assembly of claim 1, wherein the alignment plate includes a projection and wherein the faceplate includes an attachment recess, wherein the projection of the alignment plate is received in the attachment recess of the faceplate to pivotally couple the faceplate and the alignment plate.

11. The cover assembly of claim 1, wherein the faceplate includes a magnet that couples the faceplate and the alignment plate.

12. The cover assembly of claim 1, wherein the faceplate includes a first aperture and a second aperture, and wherein a portion of the first electrical switch is configured to extend through the first aperture when the faceplate is coupled to the alignment plate and a second portion of the second electrical switch is configured to extend through the second aperture when the faceplate is coupled to the alignment plate.

13. The cover assembly of claim 12, wherein the first alignment feature includes a first notch that receives a protrusion of the first electrical switch and the second alignment feature includes a second notch that receives a protrusion of the second electrical switch, and wherein the first aperture of the faceplate receives the protrusion of the first electrical switch and the second aperture of the faceplate receives the protrusion of the second electrical switch.

14. The cover assembly of claim 1, wherein the alignment plate is a single piece.

15. The cover assembly of claim 1, wherein the divider spaces the first electrical switch a horizontal distance from the second electrical switch.

16. An electrical switch and cover assembly comprising:
a first electrical switch;
a second electrical switch;
a first alignment plate removably coupled to the first electrical switch, the first alignment plate including,
a first alignment feature that receives a portion of the first electrical switch to align the first alignment plate with the first electrical switch, and
a second alignment feature that receives a first portion of the second electrical switch to align the first alignment plate with the second electrical switch and to align the second electrical switch with the first electrical switch;
a second alignment plate removably coupled to the second electrical switch, the second alignment plate including,
a first alignment feature of the second alignment plate that receives a second portion of the second electrical switch to align the second alignment plate with the first alignment plate and the second electrical switch;
and a faceplate that is removably coupled to the first and second alignment plates.

17. The electrical switch and cover assembly of claim 16, wherein the first electrical switch includes a control feature, and wherein the alignment plate includes a recess that provides access to the control feature when the alignment plate is coupled to the first electrical switch.

18. The electrical switch and cover assembly of claim 17, wherein the first electrical switch includes a bezel and an actuator movable relative to the bezel to actuate the first electrical switch, wherein the control feature is adjacent the bezel.

19. The electrical switch and cover assembly of claim 16, wherein the first electrical switch includes a protrusion and the second electrical switch includes a protrusion, wherein the first alignment feature includes a first notch that receives the protrusion of the first electrical switch and the second alignment feature includes a second notch that receives the protrusion of the second electrical switch.

20. The electrical switch and cover assembly of claim 16, wherein the first electrical switch includes a bezel and an actuator movable relative to the bezel to actuate the first electrical switch, wherein the second electrical switch includes a bezel and an actuator movable relative to the bezel to actuate the second electrical switch, and wherein the bezel of the first electrical switch forms the protrusion of the first electrical switch and the bezel of the second electrical switch forms the protrusion of the second electrical switch.

* * * * *